June 30, 1925.

R. E. HARRIS

AIR BRAKE ATTACHMENT

Filed Sept. 1, 1923

1,544,390

Inventor

Roy E. Harris

By Philip A. Ferrell

Attorney

Patented June 30, 1925.

1,544,390

UNITED STATES PATENT OFFICE.

ROY E. HARRIS, OF ST. EDWARD, NEBRASKA.

AIR-BRAKE ATTACHMENT.

Application filed September 1, 1923. Serial No. 660,527.

*To all whom it may concern:*

Be it known that ROY E. HARRIS, a citizen of the United States, residing at St. Edward, in the county of Boone and State of Nebraska, has invented certain new and useful Improvements in Air-Brake Attachments, of which the following is a specification, reference being had therein to the accompanying drawings.

The invention relates to air brake attachments for railroad cars, and has for its object to provide pipe connections between the air brake line and the boxings of the axles, said pipe connections being provided with fusible plugs, which will easily melt incident to the heating of the boxings, thereby allowing loss of pressure in the air brake line and consequent setting of the brakes of the train.

By allowing loss of pressure, trainmen will be notified that there is a hot box and can remedy the difficulty before the box is burnt out and damaged, or accident caused.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1:
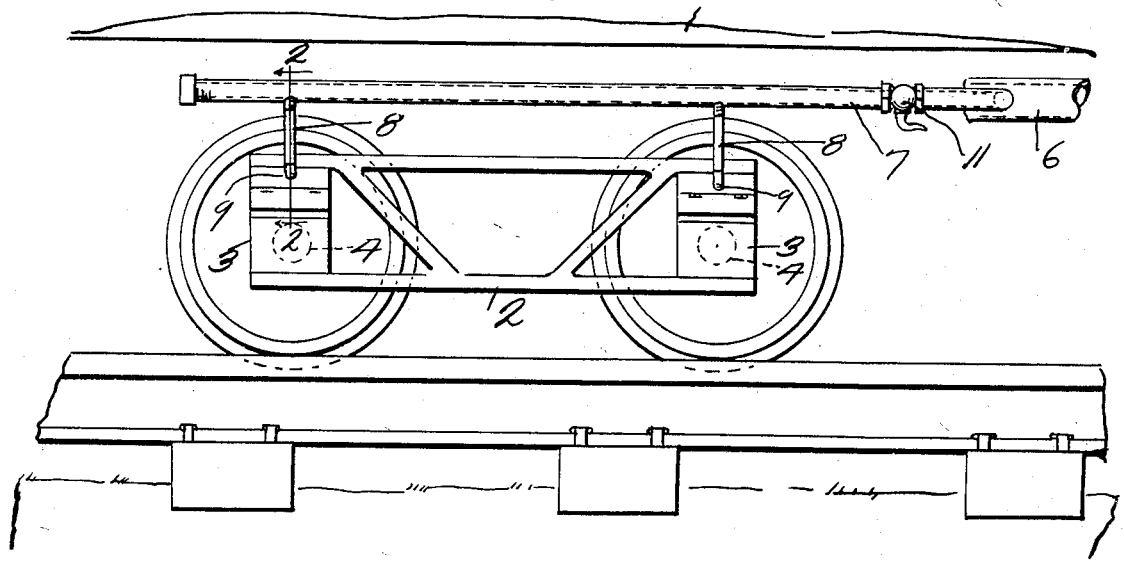
Figure 1 is a side elevation of a conventional form of railway car trucks, showing the device applied thereto.
Figure 2:
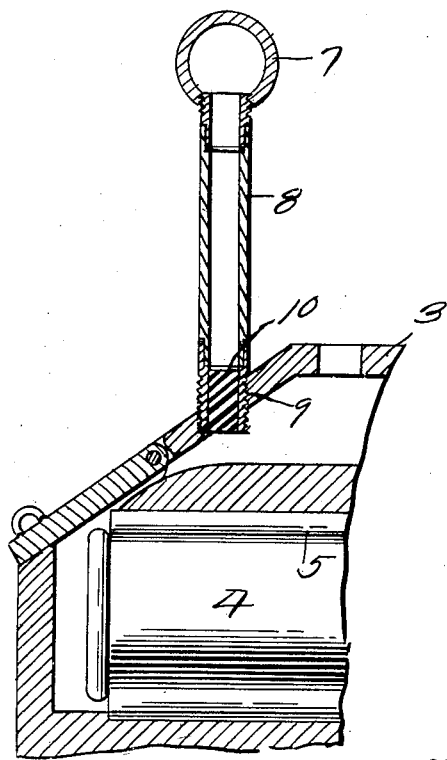
Figure 2 is a vertical transverse sectional view taken on line 2—2 of Figure 1.

Referring to the drawing, the numeral 1 designates a conventional form of railroad car, and 2 a truck carried thereby. Disposed at the ends of the truck 2 are conventional forms of axle boxings 3, in which the spindles 4 of the axles are rotatably mounted in bearings 5. It has been found that bearings and boxings become overheated, even with careful attention, which often causes considerable delay in trains, and at times accidents. To obviate this difficulty the main air line 6 of the air brake system is provided with a branch pipe 7, which extends over the boxings 3 and has connected thereto downwardly extending flexible pipes 8, the lower ends of which are threaded at 9 into the boxings 3. Disposed within the lower ends of the pipes 8 are plugs 10 formed from a fusible material, such for instance as relatively soft solder. A pressure is always maintained within the main pipe line 6, and when said pressure is reduced, the brakes of the train are set in the usual manner, consequently the branch pipe 7 and the pipes 8 have substantially the same pressure therein as the main pipe line 6, however if the bearing 5 and the boxings 3 become heated to a dangerous point, the fusible plugs 10 are melted, and consequently air pressure within the pipe line 6 is lost and the brakes of the train are set, thereby warning trainmen that there is a hot box somewhere in the train, which hot box may be located and repaired and consequently long delays and accidents, incident to hot boxes are avoided.

From the above it will be seen that a hot box attachment for air brake lines is provided, wherein loss of pressure within the air line will be insured against development of the hot box and the brakes of the same will be immediately set. It will also be seen that the device is simple in construction and may be easily and quickly applied without materially modifying the structure. The branch pipe 7 is provided with a valve 11, whereby air may be cut off from the same if desired, for instance when repairing the hot box.

The invention having been set forth what is claimed as new and useful is:—

The combination with an air brake pipe wherein pressure is maintained, axle boxings having air vents, of a pipe connected to the air brake pipe and disposed above the boxings, vertically disposed pipe connections between the boxings and the pipe disposed above the same and vertically disposed fusible plugs disposed within the lower ends of the boxing connected pipes and disposed below the air vents.

In testimony whereof I hereunto affix my signature.

ROY E. HARRIS.